Q. ZUBER.
OVERSHOE FOR ANIMALS.
APPLICATION FILED MAR. 18, 1913.
1,078,479.
Patented Nov. 11, 1913.
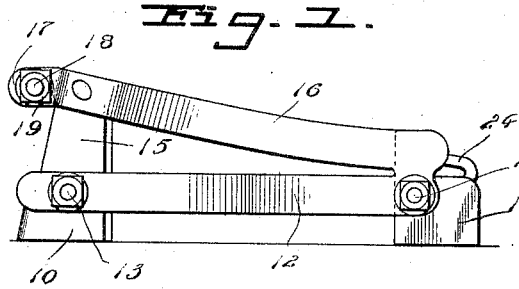
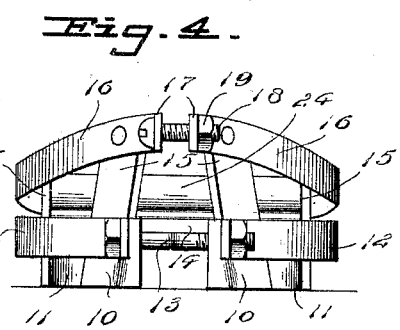
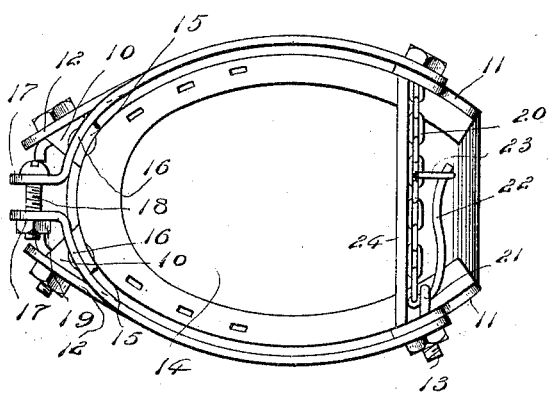
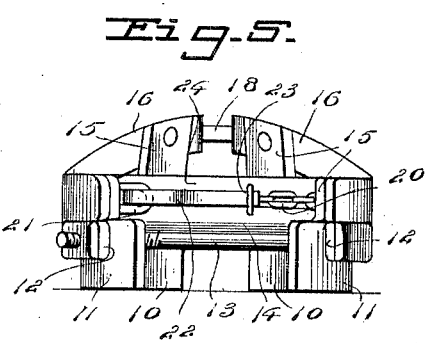
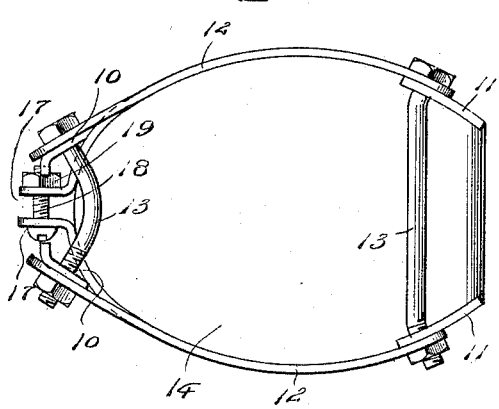
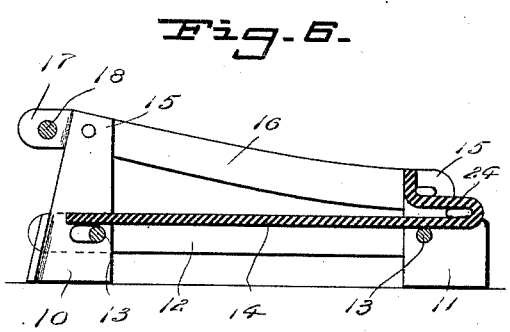
Inventor
Quirin Zuber
Witnesses
By Victor J. Evans
Attorney

UNITED STATES PATENT OFFICE.

QUIRIN ZUBER, OF MOUNT VERNON, NEW YORK.

OVERSHOE FOR ANIMALS.

1,078,479. Specification of Letters Patent. Patented Nov. 11, 1913.

Application filed March 18, 1913. Serial No. 755,219.

*To all whom it may concern:*

Be it known that I, QUIRIN ZUBER, a citizen of the United States, residing at Mount Vernon, in the county of Westchester and State of New York, have invented new and useful Improvements in Overshoes for Animals, of which the following is a specification.

The invention relates to overshoes for animals, and more particularly to the class of anti-creeping devices for use on the hoofs of animals.

The primary object of the invention is the provision of a device in which the foot of an animal may be clamped so that on traveling over slippery surfaces the said animal will be prevented from slipping, as it will enable the animal to gain a firm footing on the surface thereby avoiding injury resulting from falls or otherwise.

Another object of the invention is the provision of a device of this character which can be readily and easily applied to the hoof of an animal and that can be securely fastened thereto without requiring the removal of the ordinary horseshoe.

A further object of the invention is the provision of a device of this character which is simple in construction, strong, durable, and which possesses minimum weight, capable of being readily and quickly applied to the hoof of an animal and one which may be manufactured at a minimum cost.

With these and other objects in view the invention consists in the construction, combination and arrangement of parts as will be hereinafter more fully described, illustrated in the accompanying drawing, and pointed out in the claims hereunto appended.

In the drawing:—Figure 1 is a side elevation of an anti-creeping device constructed in accordance with the invention. Fig. 2 is a top plan view thereof, showing the horseshoe therein. Fig. 3 is a bottom plan view. Fig. 4 is a front elevation. Fig. 5 is a rear elevation. Fig. 6 is a vertical longitudinal sectional view through the same.

Similar reference characters indicate corresponding parts throughout the several views in the drawing.

Referring to the drawings by numerals the anti-creeping device or overshoe comprises front and rear or toe and heel calks 10 and 11 respectively, the front calks being connected to the rear calks by means of slightly outwardly bowed side bars 12 through which and also the said calks are passed transverse tie bolts 13 upon which rests a resilient base section 14 which is substantially the shape of an animal's hoof and is preferably constructed from rubber, although the same may be made from leather or any other suitable material possessing the requisite rigidity and against the inner face of which engages an ordinary horseshoe when fastened to the hoof of the animal. The base section 14 rests solely upon the tie bolts 13 which serve to hold it up and the weight which it carries.

Rising from the calks 10 and 11 are extensions 15 to which are fixed hoof clamping bars 16, the same being formed with outturned parallel front ears 17 through which is passed an adjusting bolt 18 carrying the usual nut 19 whereby on adjusting of the said bolt the hoof engaging bars 16 can be regulated for clamping the hoof of an animal irrespective of the side of the said hoof.

Suitably anchored in the extension 15 of one of the heel or rear calks 11 is one end of a chain 20, while fixed in the extension 15 of the other heel or rear calk 11 is an eye or staple 21 through which works a draw lever 22, the same being connected to the chain 20 at its free end and being adapted to be swung inwardly in the direction of the said chain for contracting the hoof engaging bars 16, thereby securely clamping the same about the side and front of the hoof for the secure mounting of the anti-creeping device or overshoe thereon. Connected to the chain 20 is a retaining link or loop 23 which is adapted to be engaged with the lever 22 when swung inwardly in the direction of the chain so as to prevent the outward swinging of the lever for the accidental releasing of the chain when drawn taut for the clamping of the device or overshoe upon the hoof of an animal.

Formed on the heel end of the section 14 is a tongue or flap 24 which is inserted between the chain and the rear portion of the hoof of the animal so as to prevent the rubbing of the chain 20 against the hoof to avoid bruising or otherwise injuring the same while the anti-creeping device or overshoe is being worn.

The device or overshoe with the section 14 therein will protect the hoof of the animal to prevent cracking or spreading thereof, and also obviate the bruising of the frog of the hoof by pebbles or other objects or irregularities in the ground thereby avoiding foot troubles incident to the working of the animal.

From the foregoing description, taken in connection with the accompanying drawing, it is thought that the construction and operation of the invention will be clearly understood, and therefore, a more extended explanation has been omitted.

What is claimed is:—

1. A device of the class described comprising a pair of outwardly bowed separable side bars, front and rear cross tie bolts connecting the same, a resilient base section removably held between the side bars and resting upon the tie bolts, toe and heel calks carried by the side bars, and clamping means integrally formed with the rear ends of the side bars and extending forwardly and upwardly therefrom.

2. A device of the class described comprising a pair of outwardly bowed separable side bars, front and rear cross tie bolts connecting the same, a resilient base section removably held between the side bars and resting upon the tie bolts, toe and heel calks carried by the side bars, clamping means integrally formed with the rear ends of the side bars and extending forwardly and upwardly therefrom, and a forwardly and upwardly bent flap formed at the rear end edge of the said section.

3. A device of the class described comprising a pair of outwardly bowed separable side bars, front and rear cross tie bolts connecting the same, a resilient base section removably held between the side bars and resting upon the tie bolts, toe and heel calks carried by the side bars, clamping means integrally formed with the rear ends of the side bars and extending forwardly and upwardly therefrom, a forwardly and upwardly bent flap formed at the rear end edge of the said section, and means connected with the side bars at the rear ends thereof for adjusting the same with relation to each other.

In testimony whereof I affix my signature in presence of two witnesses.

QUIRIN ZUBER.

Witnesses:
 ALBERTUS T. KHINTOP,
 W. WALTER INGRAHAM.

---

Copies of this patent may be obtained for five cents each, by addressing the "Commissioner of Patents, Washington, D. C."